(12) United States Patent
Sawada et al.

(10) Patent No.: US 7,466,337 B2
(45) Date of Patent: Dec. 16, 2008

(54) CONSTRUCTION MACHINE

(75) Inventors: Hiroshi Sawada, Hirakata (JP); Hajime Katou, Hirakata (JP); Seiya Haga, Hirakata (JP); Toshio Yokoyama, Hirakata (JP)

(73) Assignee: Komatsu Ltd., Tokyo (JP)

( * ) Notice: Subject to any disclaimer, the term of this patent is extended or adjusted under 35 U.S.C. 154(b) by 664 days.

(21) Appl. No.: 10/170,231

(22) Filed: Jun. 13, 2002

(65) Prior Publication Data

US 2003/0085995 A1    May 8, 2003

(30) Foreign Application Priority Data

Jun. 15, 2001 (JP) ............... 2001-182354
Jun. 15, 2001 (JP) ............... 2001-182355

(51) Int. Cl.
*H04N 7/18* (2006.01)
(52) U.S. Cl. ..................................... 348/148
(58) Field of Classification Search .......... 348/142–160
See application file for complete search history.

(56) References Cited

U.S. PATENT DOCUMENTS

| | | | |
|---|---|---|---|
| 4,518,990 A * | 5/1985 | Gilvydis ............ 348/39 |
| 5,121,200 A * | 6/1992 | Choi .............. 348/148 |
| 5,530,421 A * | 6/1996 | Marshall et al. ...... 340/436 |
| 5,650,579 A * | 7/1997 | Hatley et al. ......... 73/865.8 |
| 5,836,398 A * | 11/1998 | White ............. 169/24 |
| 6,140,930 A * | 10/2000 | Shaw .............. 340/685 |
| 6,144,296 A * | 11/2000 | Ishida et al. ......... 340/461 |
| 6,158,535 A * | 12/2000 | Porubcansky et al. ... 180/9.1 |
| 6,175,300 B1 * | 1/2001 | Kendrick ............ 340/436 |
| 6,222,447 B1 * | 4/2001 | Schofield et al. ...... 340/461 |
| 6,498,620 B2 * | 12/2002 | Schofield et al. ...... 348/148 |
| 6,580,373 B1 * | 6/2003 | Ohashi ............. 340/901 |
| 6,690,268 B2 * | 2/2004 | Schofield et al. ...... 340/438 |
| 2002/0007973 A1 * | 1/2002 | Lakes ............. 180/9.21 |

FOREIGN PATENT DOCUMENTS

JP    2001-140286    5/2001

* cited by examiner

*Primary Examiner*—Andy S Rao
(74) *Attorney, Agent, or Firm*—Westerman, Hattori, Daniels & Adrian, LLP.

(57) ABSTRACT

A construction machine comprises a lower traveling body and an upper revolving body rotatably attached to the lower traveling body via a revolving mechanism 2, wherein a rear surveillance camera is arranged on a back surface side of the upper revolving body between a counter weight of the upper revolving body and a swing circle of the revolving mechanism, and right and left crawler end portions of the lower traveling body 1 can be simultaneously visually checked by means of the rear surveillance camera.

2 Claims, 10 Drawing Sheets

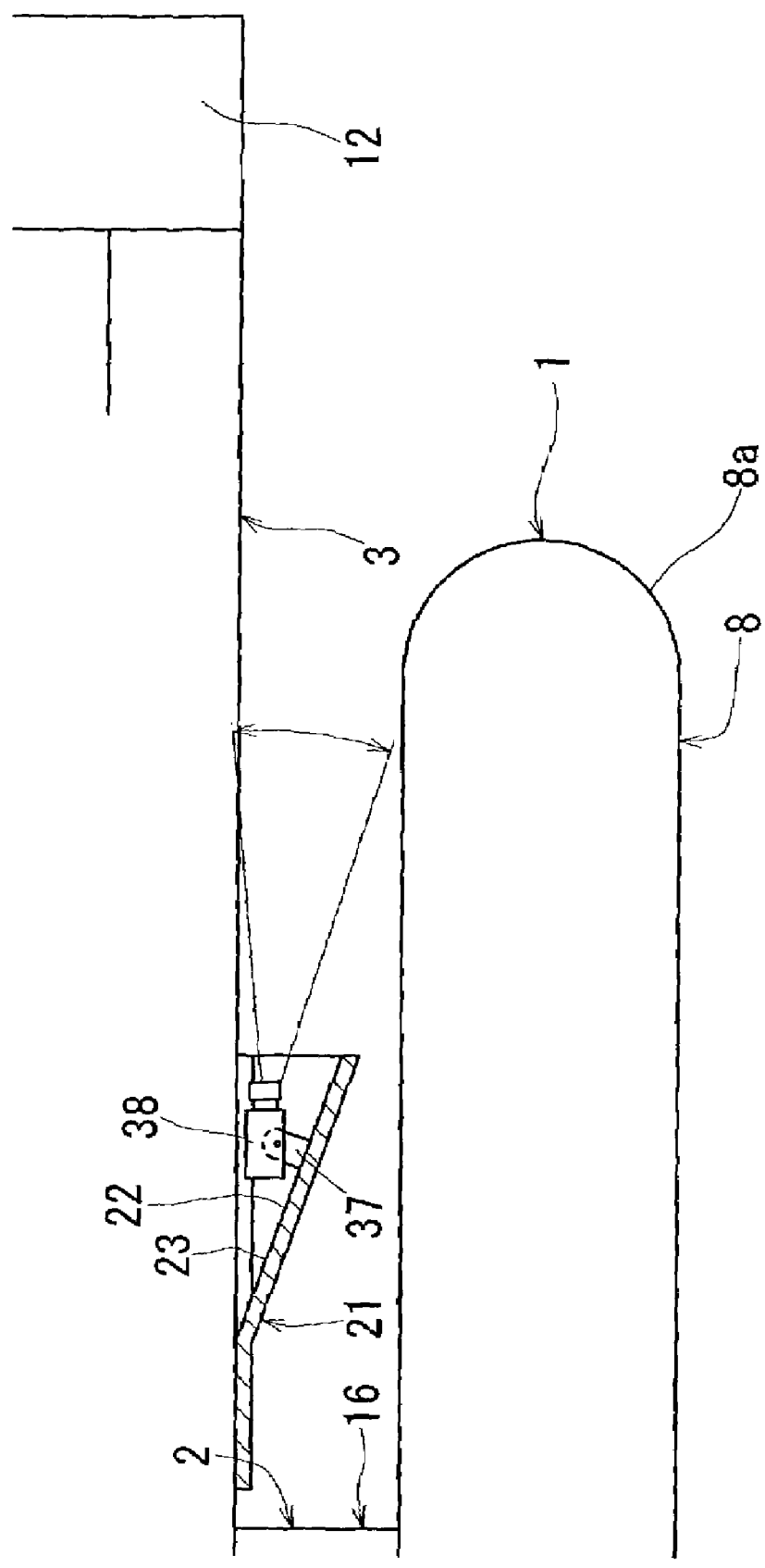

CONSTRUCTION MACHINE

FIELD OF THE INVENTION

The present invention relates to a construction machine and particularly to a construction machine provided with a lower traveling body and an upper revolving body that is rotatably attached to this lower traveling body via a revolving mechanism.

DESCRIPTION OF THE BACKGROUND ART

There is a construction machine provided with a lower traveling body and an upper revolving body rotatably that is attached to this lower traveling body via a revolving mechanism. In this case, an operator gets into an operator's cab provided in the upper revolving body to operate an operating lever that is traveling operation means thereby to move the construction machine forward or backward. In cases of such traveling, although the front and the sides of the machine can be checked (visually checked) by naked eyes of the operator through a window part provided in the operator's cab, in order to look the rear of the operator's cab, there is a need for the operator to do visual check by turning his head and body. Thus, there is a construction machine provided with a surveillance camera on a rear surface of a counter weight or the like of the upper revolving body as well as a monitoring device for displaying images from this camera in the operator's cab (for example, refer to Japanese Patent Application Laid-Open No. 140619 (1998) and Japanese Patent Application Laid-Open No. 286971 (1999). That is, disclosed is a construction machine in which images of the direction of traveling backward are displayed on a monitoring device in the case of backward traveling.

However, in the case where a camera is disposed on a rear surface of a counter weight as described above, there are cases where the camera position is at a relatively high position and thus surveillance (visual check) for a lower part adjacent to the construction machine is not sufficient. Accordingly, it happens that the lower traveling body comes into contact with an obstacle or is stuck in a recess, whereby safe traveling is difficult. In particular, part of the construction machine is not displayed in an image displayed on the monitoring device, and even if there is an obstacle and the obstacle is displayed, it is difficult to grasp the distance between the obstacle and the construction machine, whereby it is difficult to say that its practicability is sufficient.

Conventionally, there are cases where vehicle body conditions (that are operating conditions of various equipment and structural members loaded in the construction machine and are, for example, conditions such as the temperature of working fluid employed in an oil hydraulic circuit, the temperature of engine cooling water, and the like) are displayed. In such cases, it is often the case that both the screen displaying vehicle body conditions and the image from the surveillance camera are displayed on one monitoring device. For this, there is a need to provide a change-over switch between the screen displaying vehicle body conditions and the image of the surveillance camera and to operate this change-over switch. However, in this case, the change-over switch is arranged on a region located apart from a traveling lever which is for making the lower traveling body travel, and therefore it is difficult for the operator to operate the change-over switch. Thus, it can be thought that without performing any switching operation for the change-over switch or the like, images in the direction of traveling backward are displayed on a monitoring device automatically when a lower traveling body is in the backward traveling condition. However, when the lower traveling body travels forward, if the upper revolving body is in a turning around condition, the operator regards the construction machine as being traveling backward. In this case, even though a surveillance camera is provided, surveillance by this surveillance camera is not performed, and the camera is useless.

The present invention was made to solve the above-mentioned conventional drawbacks, and it is an object of the present invention to provide a construction machine in which surveillance for backward states can reliably be performed and work safety can be improved.

SUMMARY OF THE INVENTION

The construction machine of a first invention is a construction machine provided with a lower traveling body 1 and an upper revolving body 3 that is rotatably attached to the lower traveling body 1 via a revolving mechanism 2, characterized in that a rear surveillance camera 38 is arranged on a back surface side of the upper revolving body 3 between a counter weight 12 of the above-mentioned upper revolving body 3 and a swing circle 16 of the above-mentioned revolving mechanism 2, and right and left crawler end portions 8a, 8a of the above-mentioned lower traveling body 1 can be simultaneously visually checked by means of the rear surveillance camera 38.

In the construction machine of the first invention, rear images can be displayed on, for example, a monitor screen 39 by means of the rear surveillance camera 38. Further, since the right and left crawler end portions 8a, 8a of the lower traveling body 1 are displayed on the monitor screen 39, if there is an obstacle or the like in the rear and this obstacle is displayed on the monitor screen 39, the distance between the obstacle and the present construction machine can be grasped, whereby safe traveling can be achieved. Since the right and left crawler end portions 8a, 8a are displayed, visual check for a lower part adjacent to the lower traveling body 1 is possible, the present construction machine can be effectively prevented from colliding with an obstacle or the like adjacent to the lower traveling body 1, and the lower traveling body can be effectively prevented from being stuck in a recess. Moreover, since the rear surveillance camera 38 is arranged on a back surface side of the upper revolving body 3 between a counter weight 12 of the upper revolving body 3 and a swing circle 16 of the revolving mechanism 2, the rear surveillance camera 38 is not exposed to the weather, whereby durability is improved, and stable surveillance can be implemented.

The construction machine of a second invention characterized in that a lower rear end part of the counter weight 12 can be visually checked by means of the above-mentioned rear surveillance camera 38.

In the construction machine of the second invention, since a lower rear end part of the counter weight 12 can be visually checked by means of a monitor screen 39 of the rear surveillance camera 38, the distance between an obstacle and the present construction machine can be grasped further stably, and thus improvement of safety can be achieved even more.

The construction machine of a third invention is characterized in that the above-mentioned rear surveillance camera 38 is arranged in an inner surface side of an under cover 21 of a revolving frame 10 of the above-mentioned upper revolving body 3.

In the construction machine of the third invention, since the rear surveillance camera 38 is arranged in an inner surface side of an under cover 21 of a revolving frame 10 of the upper revolving body 3, during traveling and the like, if there is an obstacle such as a rock and a steel frame on the traveling ground and this obstacle collides with the present construction machine, the rear surveillance camera 38 is protected by the under cover 21 and is hard to be damaged. The rear surveillance camera 38 can be prevented from being stuck by earth, sand, and the like from a lower side, and therefore surveillance for the rear by means of the rear surveillance camera 38 can be stably implemented. Further, since the rear surveillance camera 38 is attached to the conventionally existing under cover 21, any new member is not necessary in order to hold the rear surveillance camera 38, whereby the number of components can be prevented from increasing, and assembling processes can be prevented from being complicated.

The construction machine of a fourth invention is characterized in that switching between a storing state in which the above-mentioned rear surveillance camera 38 is stored in the revolving frame 10 side and a visual check possible state in which the rear surveillance camera 38 is exposed to the outside is possible, and that said switching is operated through a switching operation by an operator in an operator's cab 11 of the upper revolving body 3.

In the construction machine of the fourth invention, the rear surveillance camera 38 can be in a storing state in which the camera 38 is stored in the revolving frame 10 side, and by causing the storing state when the camera 38 is not used, the rear surveillance camera 38 can be effectively prevented from being damaged or tainted, whereby the rear surveillance camera 38 can be used stably for a long time. Further, by causing the visual check possible state in which the rear surveillance camera 38 is exposed to the outside, the rear can be confirmed, and safe traveling can be achieved.

The construction machine of a fifth invention is a construction machine provided with a lower traveling body 1 and an upper revolving body 3 that is rotatably attached to the lower traveling body 1 and the above-mentioned lower traveling body 1 is made to travel forward or backward by operating a traveling operation means 26, characterized in that a rear surveillance camera 38 is arranged on the above-mentioned upper revolving body 3 and that an image from the rear surveillance camera 38 is displayed on a monitor screen 39 by operating the above-mentioned traveling operation means 26.

In the construction machine of the fifth invention, since an image from the rear surveillance camera 38 can be displayed on a monitor screen 39 by operating the traveling operation means 26, an operator need not to do a special operation (a switching operation) in order to display an image from the rear surveillance camera 38 on the monitor screen 39. That is, when the construction machine travels by operating the traveling operation means 26, observation by means of the rear surveillance camera 38 becomes possible, whereby safe traveling can be achieved. In a case where the lower traveling body 1 travels forward, if the upper revolving body 3 is in a state of being turned around, such state is that the construction machine travels backward for the operator in the operator's cab 11. Even in this case, since the traveling operation means 26 is operated, observation for the rear of the operator by means of the rear surveillance camera 38 is possible, and the rear with respect to the operator can be confirmed, whereby safety is ensured.

The construction machine of a sixth invention is characterized in that switching between a first mode in which an image from the rear surveillance camera 38 is displayed on the monitor screen 39 and a second mode in which a vehicle body condition is displayed on the monitor screen 39 is possible, and that said switching is operated through an operation of the traveling operation means 26.

In the construction machine of the sixth invention, an image from the rear surveillance camera 38 can be displayed on the monitor screen 39 by operating the traveling operation means 26, and a vehicle body condition can be displayed on the monitor screen 39 if the traveling operation means 26 is not operated. That is, while the lower traveling body 1 travels forward or backward, the rear can be confirmed by means of the rear surveillance camera 38, whereby safe traveling is possible. While the lower traveling body 1 is stopped to execute various operations, a vehicle body condition can be grasped, and stable operations are possible. Further, since one common screen is used for the screen displaying images of the rear and also for the screen displaying a vehicle body condition, a monitor screen conventionally provided in the operator's cab 11 can be used. Thus, since it is not necessary to provide a separate monitor for confirming the rear, the space of the operator's cab can be fully ensured. Here, such vehicle body conditions are operating conditions of various equipment and structural members loaded in the present construction machine and are, for example, conditions such as the temperature of working fluid employed in an oil hydraulic circuit, the temperature of engine cooling water, and the like.

The construction machine of a seventh invention is a construction machine provided with a lower traveling body 1 and an upper revolving body 3 that is rotatably attached to the lower traveling body 1 and the above-mentioned lower traveling body 3 is made to travel forward or backward by operating a traveling operation means 26, characterized in that a rear surveillance camera 38 is arranged on the above-mentioned upper revolving body 3 and that a switch 48 for allowing a monitor screen 39 to be in a state of displaying an image from the above-mentioned rear surveillance camera 38 is provided in the above-mentioned traveling operation means 26.

In the construction machine of the seventh invention, since a monitor screen 39 comes to be in a state of displaying an image from the above-mentioned rear surveillance camera 38 by operating the switch 48 provided in the traveling operation means 26, the image displaying state can be caused by operating the switch 48 as an operator desires. Thus, even in cases where an operation is executed by means of a work machine provided on the upper revolving body 3 while the lower traveling body 1 is stopped, confirming the rear is possible. Further, in a case where the construction machine travels from a stop state where the traveling operation means 26 is not operated, that is, at the time of start, if the switch 48 is operated to cause the image displaying state so as to cause a state where confirming the rear is possible, safety of this start time can be improved.

BRIEF DESCRIPTION OF THE DRAWINGS

FIG. 8 is a schematic sectional view of the main part of the above-mentioned construction machine;

DESCRIPTION OF THE PREFERRED EMBODIMENTS

Figure 2:
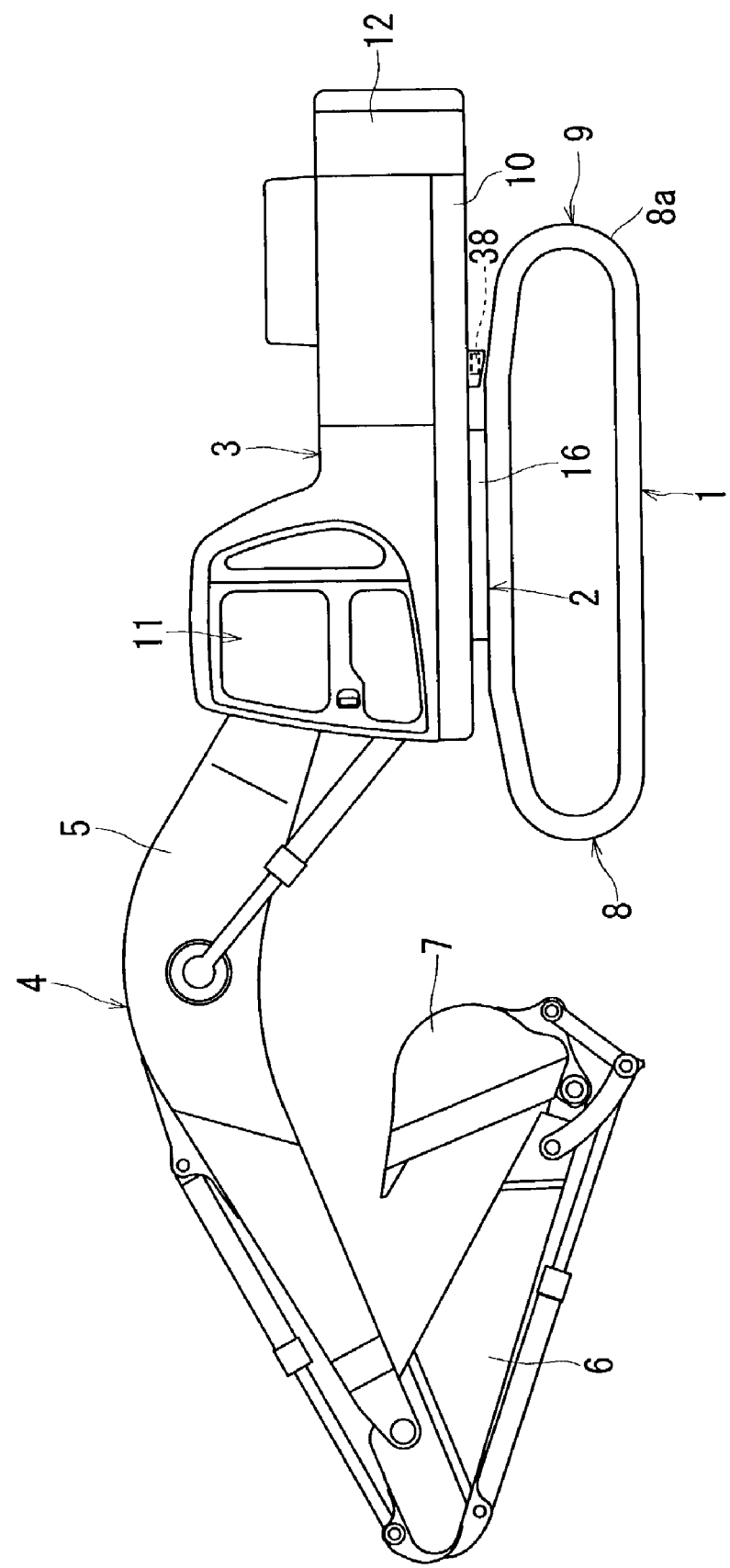
FIG. 2 is a side view of the above-mentioned construction machine.
Figure 3:
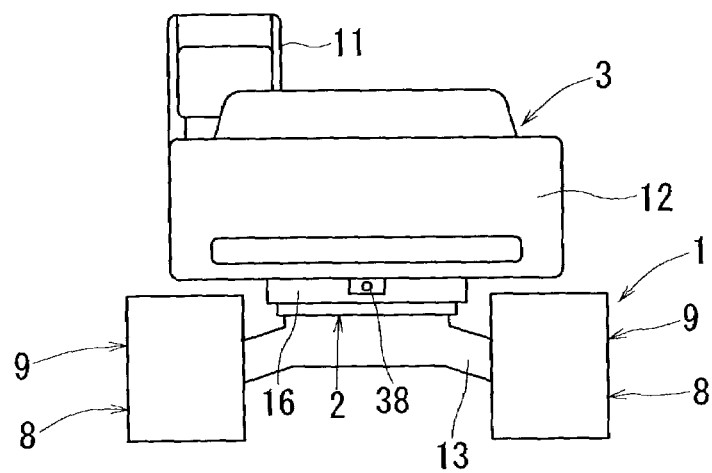
FIG. 3 is a rear elevation of the above-mentioned construction machine.

Next, a specific first embodiment of a construction machine of the present invention is explained in detail referring to the accompanying drawings. FIG. 2 is a schematic side view of the construction machine (in this case, showing a hydraulic shovel), and FIG. 3 is a schematic rear elevation thereof. This construction machine is provided with a lower traveling body 1 and an upper revolving body 3 which is rotatably attached to an upper part of the lower traveling body 1 via a revolving mechanism 2, and a work machine 4 is continuously disposed on the upper revolving body 3. This work machine 4 is provided with a boom 5 whose base portion is swingably coupled with the upper revolving body 3, an arm 6 swingably coupled with the head of the boom 5, and a bucket 7 swingably coupled with the head of the arm 6.

The lower traveling body 1 is provided with a pair of right and left traveling sections 9, 9 having crawlers 8, and the crawlers 8, 8 of the respective traveling sections 9, 9 are driven to travel. The pair of right and left traveling sections 9, 9 are coupled via a truck frame 13 (refer to FIG. 5 and the like). As shown in FIG. 2, the upper revolving body 3 is provided with a revolving frame 10, an operator's cab 11 arranged on this revolving frame 10, and a counter weight 12 arranged on a rear portion of the revolving frame 10.

Figure 5:
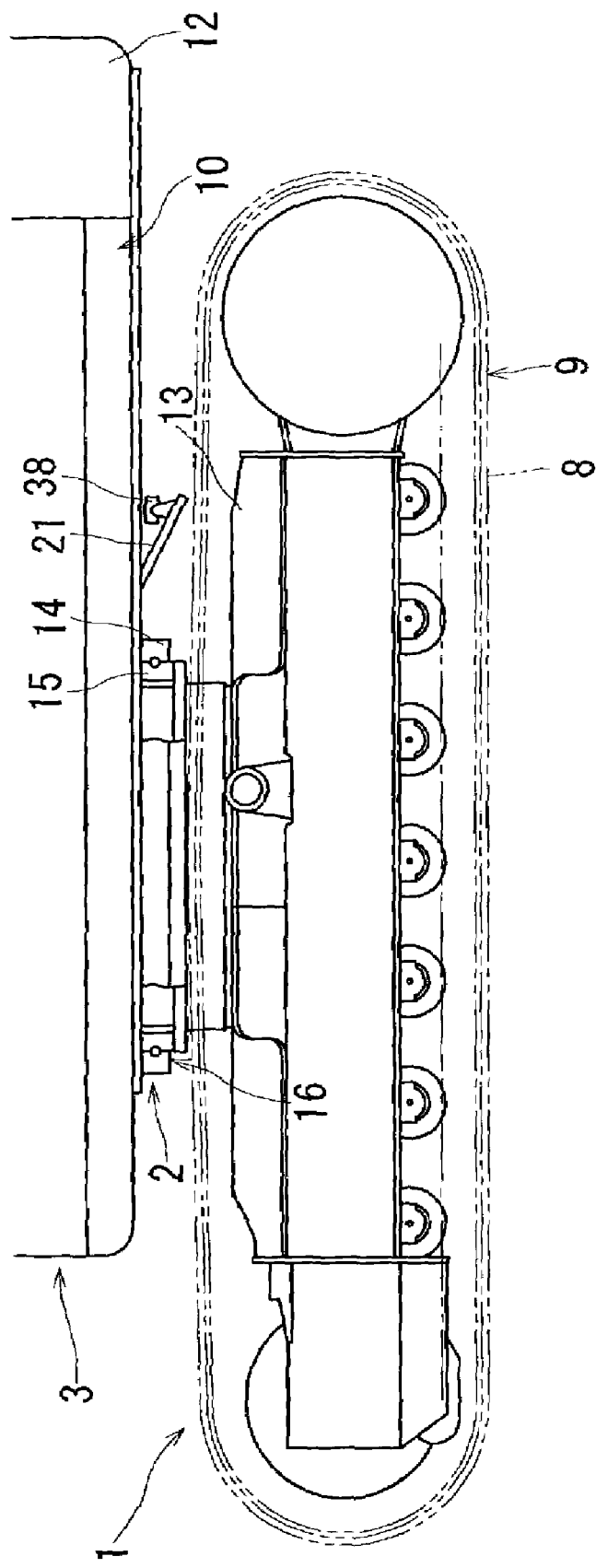
FIG. 5 is a side view of the main part of the above-mentioned construction machine.
Figure 6:
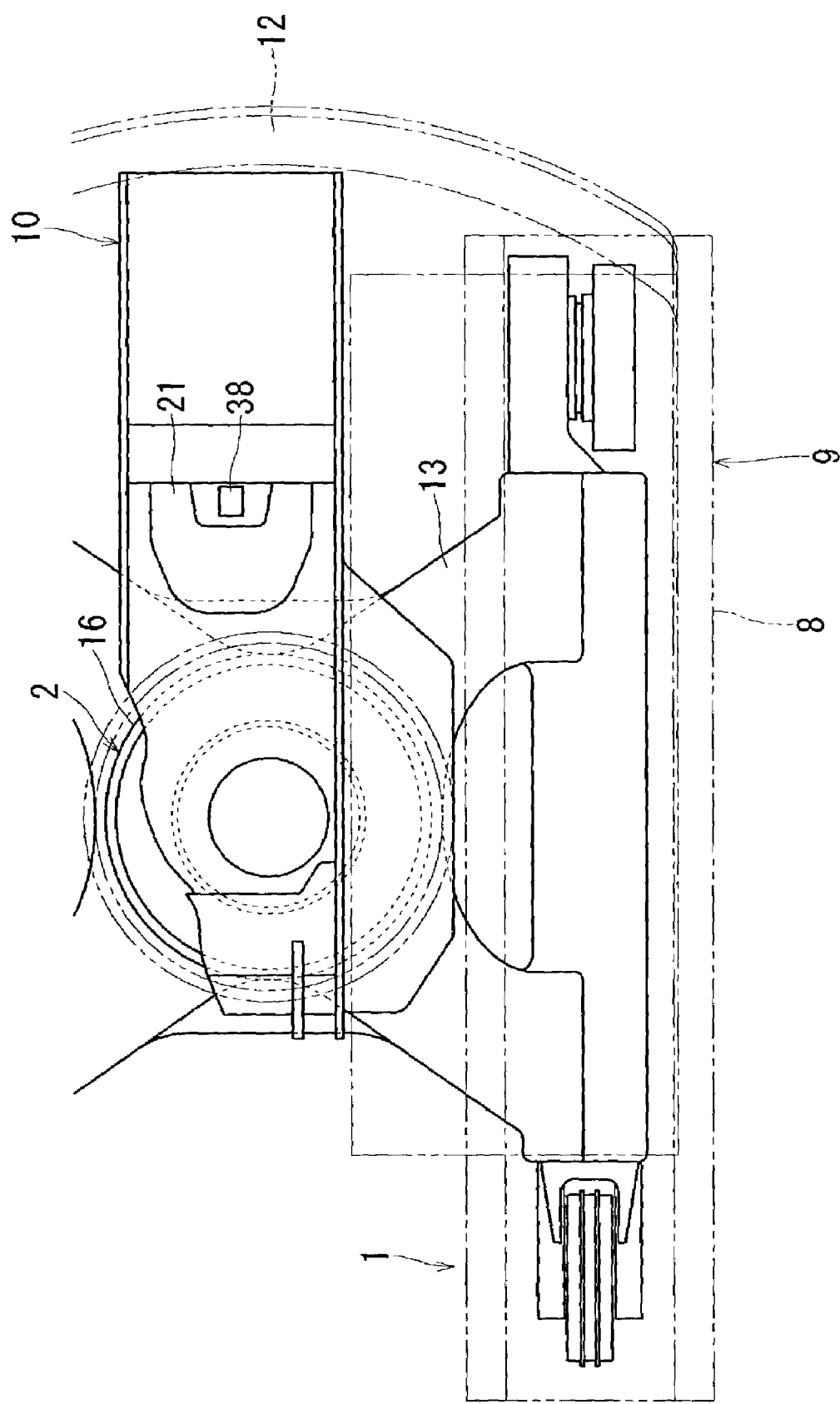
FIG. 6 is a plan view of the main part of the above-mentioned construction machine.

As shown in FIGS. 5 and 6, the above-mentioned revolving mechanism 2 is comprised of a swing circle 16, a hydraulic drive swing motor (not shown), swing machinery (not shown) for reducing the rotational speed of the swing motor, a swing pinion (not shown) for transmitting the driving force of the swing machinery to an internal tooth of an inner race 15, and the like. The swing circle 16 is comprised of an outer race 14 attached to the revolving frame 10 and an inner race 15 attached to the truck frame 13.

Figure 7:
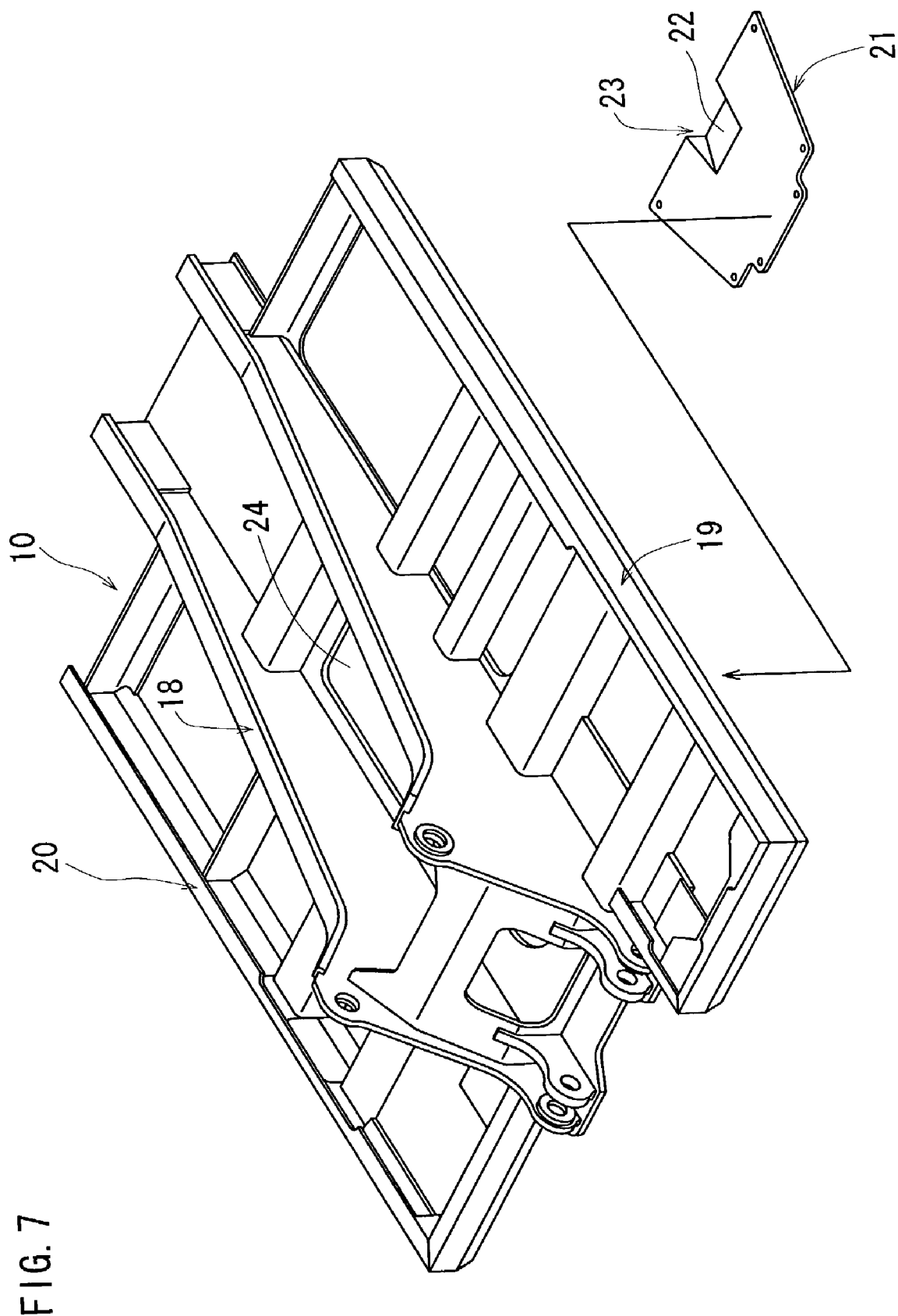
FIG. 7 is a perspective view of a revolving frame of the above-mentioned construction machine.

As shown in FIG. 7, the revolving frame 10 is provided with a center frame 18 and side frames 19, 20 continuously disposed in the right and left direction of the center frame 18, and an opening 24 adjacent to a central portion of the center frame 18 is closed by an under cover 21. The under cover 21 in this case is provided with a recess 23 whose bottom surface is a taper surface 22 gradually inclined backward. The under cover 21 is for preventing earth, sand, and the like from going into the upper revolving body 3.

Figure 4:
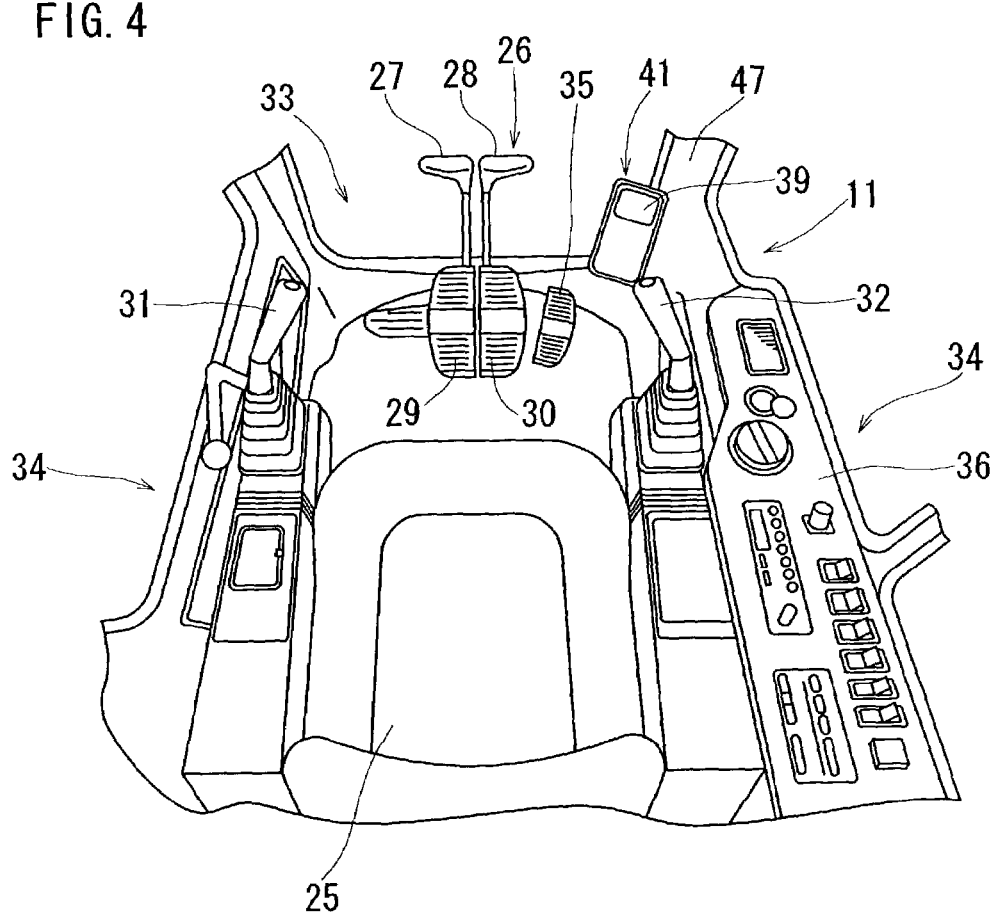
FIG. 4 is a perspective view of the operator's cab of the above-mentioned construction machine.

As shown in FIG. 4, an operator's seat 25 is arranged in a central portion of the operator's cab 11, and traveling operation means 26 is disposed in front of the operator's seat 25. The traveling operation means 26 has a pair of right and left traveling levers 27, 28 and traveling pedals 29, 30 which are swung as a unit with the respective traveling levers 27, 28. Respective work machine operating levers 31, 32 are disposed in sides of the operator's seat 25. The operator's cab 11 has a front window 33 for checking the front thereof and side windows 34, 34 for checking the sides thereof.

In this case, when the traveling levers 27, 28 are pressed forward, the lower traveling body 1 travels forward, and when the traveling levers 27, 28 are pulled backward, the lower traveling body 1 travels backward. When only one traveling lever 27 is operated, corresponding only one traveling section 9 is driven, and when only the other traveling lever 28 is operated, corresponding only one traveling section 9 is driven. Further, since the respective traveling levers 27, 28 and the respective traveling pedals 29, 30 swing as a unit, when the traveling levers 27, 28 are operated, when the traveling levers 27, 28 and traveling pedals 29, 30 are together operated, and when the traveling pedals 29, 30 only are operated, corresponding traveling sections 9 are driven. The above-mentioned work machine operating levers 31, 32 are for performing the operations of going up and down movements of the boom 5, the rotations of the arm 6 and the bucket 7, revolution of the upper revolving body 3 itself, and the like. A brake pedal 35 is disposed adjacent to the traveling operation means 26, and a dashboard 36 is arranged in one side of the side windows 34.

Figure 1:
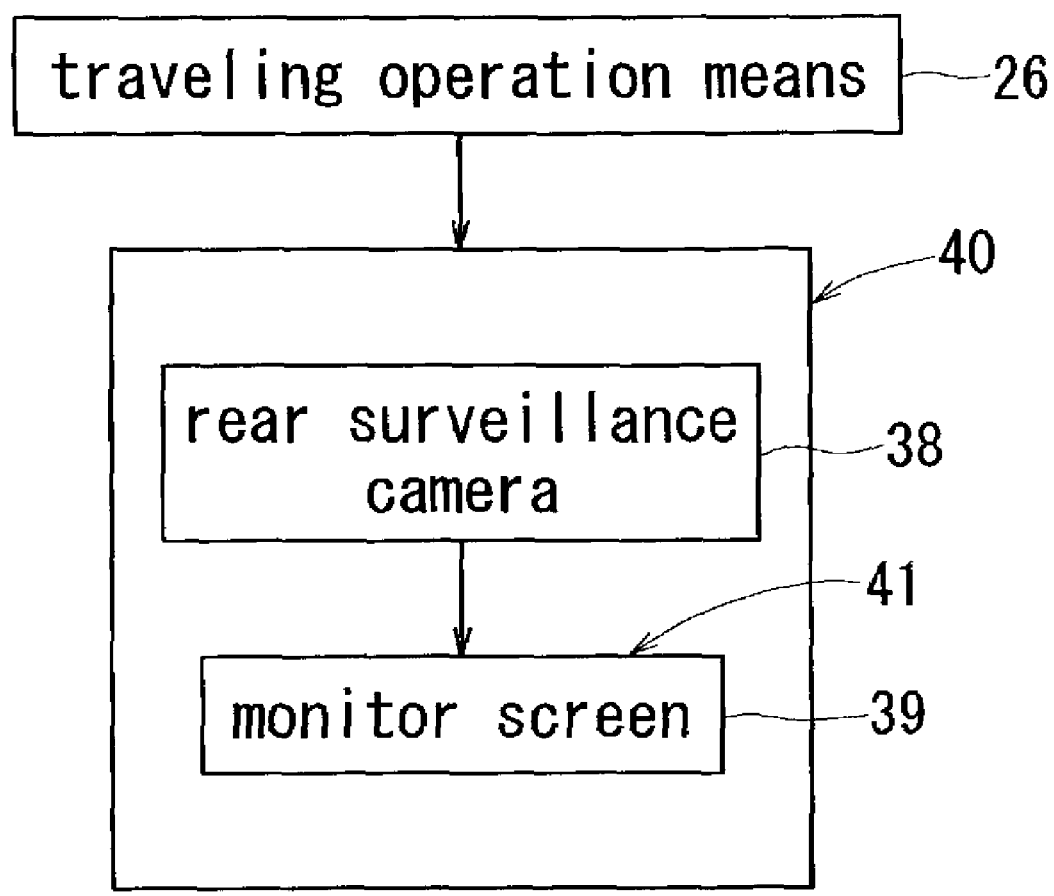
FIG. 1 is a schematic block diagram showing a first embodiment of a construction machine of the present invention.

When an operator sits down on the operator's seat 25 of this operator's cab 11 to work using the work machine 4 or make the construction machine travel, although the front and the sides thereof can be checked by means of the front window 33 and the side windows 34, 34, the rear (the rear with respect to the operator) cannot be checked. Thus, in the present invention, as shown in FIG. 1, provided is rear surveillance means 40 including a rear surveillance camera 38 and a monitor screen 39 for displaying images from the rear surveillance camera 38.

The rear surveillance camera 38 is, for example, composed of a CCD camera and is arranged on the back surface side of the upper revolving body between the counter weight 12 of above-mentioned upper revolving body 3 and the swing circle 16 of the above-mentioned revolving mechanism 2 as shown in FIG. 8. In this case, the camera is arranged on the inner surface of the above-mentioned under cover 21, namely, on the recess 23. That is, a support frame 37 extends upwardly from the taper surface 22 of the recess 23, and the rear surveillance camera 38 is swingably supported on this support frame 37 so that the direction of surveillance of the rear surveillance camera 38 can be changed.

Figure 9A:
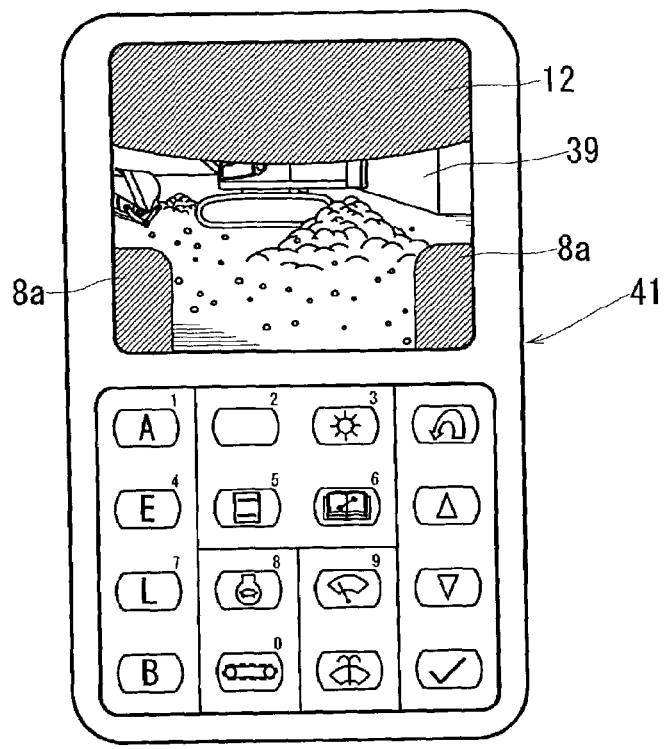
FIG. 9A is an explanatory view of a monitor screen for a rear surveillance state of the above-mentioned construction machine.
Figure 9B:
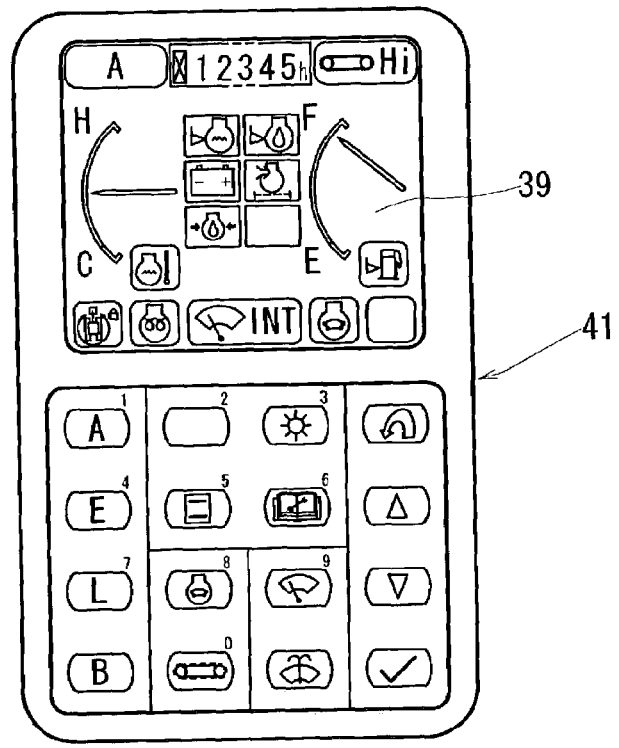
FIG. 9B is an explanatory view of a monitor screen for a vehicle body condition of the above-mentioned construction machine.
Figure 10:
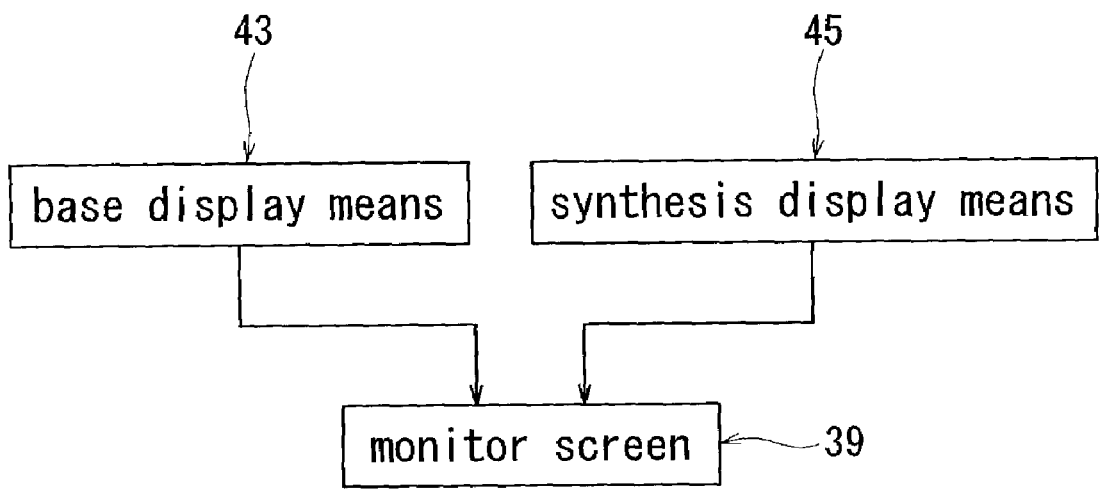
FIG. 10 is a schematic block diagram of a control section of a monitoring device of the above-mentioned construction machine.

Then, as shown in FIG. 9, the monitor screen 39 is composed of a screen of a monitoring device 41. The monitoring device 41 in this case can be switched between a first mode for displaying images from the rear surveillance camera 38 as shown in FIG. 9A and a second mode for displaying vehicle body conditions as shown in FIG. 9B. Here, vehicle body conditions are operating conditions of various equipment and structural members loaded in the present construction machine and are, for example, conditions such as the temperature of working fluid employed in an oil hydraulic circuit, the temperature of engine cooling water, and the like. That is, as shown in FIG. 10, a control section of the monitoring device 41 includes base display means 43 for displaying base images such as a temperature scale, various pictures/patterns and synthesis display means 45 for synthesizing base image data of this base display means 43 and image data for showing condition amounts to display the monitor screen 39, whereby vehicle body conditions are displayed on the monitor screen 39.

The switching between the first mode and the second mode is performed by operating the above-mentioned traveling operation means 26. That is, by operating the traveling levers 27, 28 and the traveling pedals 29, 30, the rear surveillance means 40 works, leading to the first mode in which rear surveillance (visual check) by means of the rear surveillance camera 38 is performed. In a state where the traveling operation means 26 is not operated, images from the rear surveillance camera 38 are not displayed on the monitor screen 39, leading to the second mode in which vehicle body conditions are displayed as shown in FIG. 9B. Here, the rear surveillance means surveillance for the rear of the operator's cab 11. Therefore, by operating the traveling operation means 26, whether the lower traveling body 1 is in a state of forward traveling or in a state of backward traveling, images of the rear of the operator's cab 11 are displayed on the monitor screen 39 as shown in FIG. 9A. For example, the monitoring device 41 is arranged in a lower part of a longitudinal frame 47 that partitions the window into the front window 33 and one side window 34, as shown in FIG. 4. However, such position is not limited to the lower part of this longitudinal frame 47, and the monitoring device 41 can be arranged at any position at which the monitor screen 39 can be observed when an operator sits down on the operator's seat 25 to make the present construction machine travel or to work using the work machine 4.

When images from the rear surveillance camera 38 are displayed on the monitor screen 39, in a state where the upper revolving body 3 is arranged in parallel to the lower traveling body 1 as shown in FIGS. 2 and 3, crawler end portions 8a, 8a of the right and left traveling sections 9, 9 of the lower traveling body 1 are displayed in right and left lower parts of the monitor screen 39 as shown in FIG. 9A. Also, even in a state where the upper revolving body 3 is rotated (revolved) at about 180 degrees from the state shown in FIGS. 2 and 3, the crawler end portions 8a, 8a are displayed on parts of the monitor screen 39. Furthermore, the visual field of the rear surveillance camera 38 corresponds to the range shown in FIG. 8, and a lower rear end of the counter weight 12 is always displayed (projected) on an upper part of the monitor screen 39 when images of the rear are displayed.

Thus, with the above-mentioned construction machine, when the traveling operation means 26 is operated, since images of the rear of the operator's cab 11 are displayed on the monitor screen 39, an operator need not to do a special operation (a switching operation) in order to display images from the rear surveillance camera 38 on the monitor screen 39. That is, when the construction machine travels by operating the traveling operation means 26, observation (visual check) by means of the rear surveillance camera 38 becomes possible, whereby safe traveling can be achieved. Further, since a lower rear end of the counter weight 12 is displayed on the monitor screen 39, therefore, the distance between an obstacle and the construction machine can be grasped. In particular, in a state where the upper revolving body 3 is arranged in parallel to the lower traveling body 1, since the right and left crawler end portions 8a, 8a can be visually, simultaneously checked, in a case where an obstacle is displayed on the monitor screen 39, the distance between the obstacle and the construction machine can be grasped stably and reliably, whereby safety improves. In a case where the lower traveling body 1 travels forward, if the upper revolving body 3 is in a state of being turned around, such state is that the construction machine travels backward for the operator in the operator's cab 11. Even in this case, since the traveling operation means 26 is operated, observation (visual check) for the rear of the operator by means of the rear surveillance camera 38 is possible, and the rear with respect to the operator can be confirmed, whereby safety is ensured.

While various operations are executed as the traveling operation means 26 is not operated and thus the lower traveling body 1 is stopped, vehicle body conditions can be grasped, and stable operations are possible. Moreover, since one common screen is used for the screen displaying images of the rear and also for the screen displaying vehicle body conditions, a monitor screen conventionally provided in the operator's cab 11 can be used. Thus, since it is not necessary to provide an additional separate monitor for confirming the rear, the space of the operator's cab 11 can be fully ensured. Moreover, since the rear surveillance camera 38 is attached to the conventionally existing under cover 21, any new member is not necessary in order to hold the rear surveillance camera 38, whereby it can be prevented that the number of components increases and that assembling processes are complicated.

Figure 11:
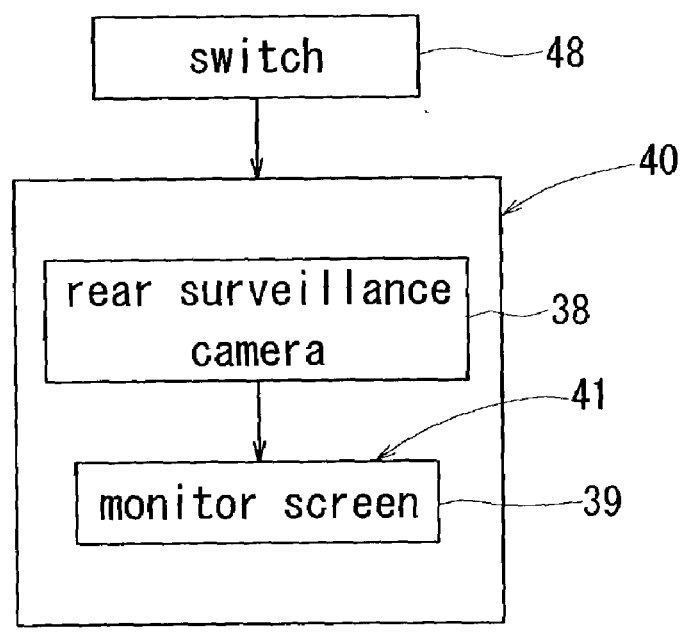
FIG. 11 is a schematic block diagram showing a second embodiment of a construction machine of the present invention.

Next, FIG. 11 illustrates a second embodiment, and in this case, a switch 48 for operating the rear surveillance means 40 is provided in the traveling operation means 26. That is, by operating the switch 48 to operate the rear surveillance means 40, rear images from the rear surveillance camera 38 are displayed on the monitor screen 39. Thus, regardless of operations of the traveling operation means 26, operating the switch 48 leads to the first mode in which surveillance for the rear of the operator is performed. By operating the switch 48 in this first mode, the mode is switched to the second mode in which vehicle body conditions are displayed.

In the above-mentioned construction machine shown in FIG. 1, since rear surveillance cannot be performed unless the traveling operation means 40 is operated, in other words, unless the construction machine is made to travel, the rear surveillance cannot be performed at the time of start of traveling operation (the time of start), there is a fear that safety at that time cannot be ensured. On the other hand, in the construction machine shown in FIG. 11, by operating the switch 48 at the time of start of traveling operation so as to display rear images from the rear surveillance camera 38 on the monitor screen 39, safety at this point of time can be ensured. Even if the lower traveling body 1 travels backward, when the upper revolving body 3 is turned around and the operator in the operator's cab 11 faces the front side with respect to the traveling direction, rear surveillance with respect to the operator is not needed so much. In this case, the switch 48 can be in OFF state so that rear surveillance by means of the rear surveillance means 40 can be stopped, whereby useless battery consumption can be prevented. Thus, in the construction machine shown in FIG. 11, an operator can implement rear surveillance in accordance with various traveling and operational conditions.

Figure 12A:
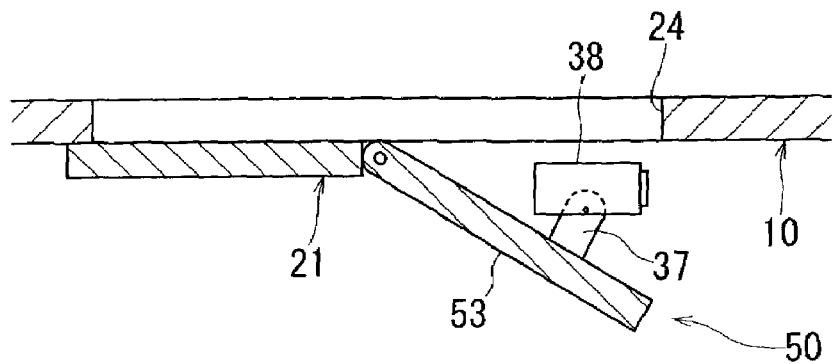
FIG. 12A is a third embodiment of a construction machine of the present invention and is a sectional view of the main part showing a state where visual check by a rear surveillance camera is possible.
Figure 12B:
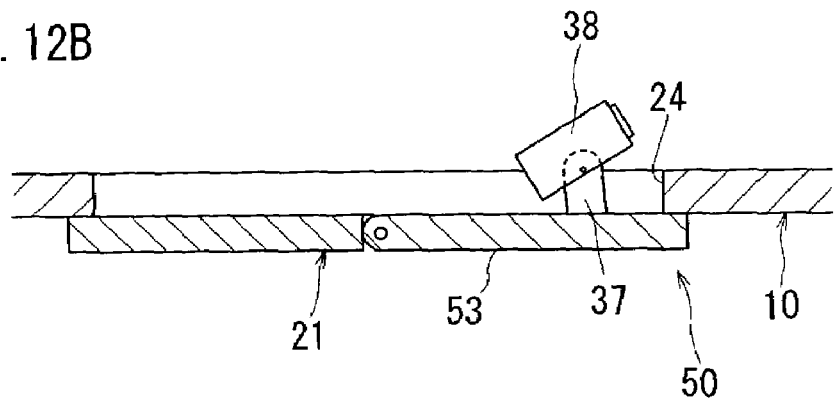
FIG. 12B is the third embodiment of the construction machine of the present invention and is a sectional view of the main part showing a state where the rear surveillance camera is stored.
Figure 13:
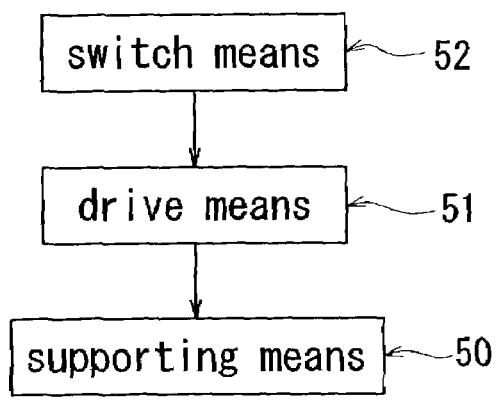
FIG. 13 is a schematic block diagram of the third embodiment of the above-mentioned construction machine.

In a construction machine of a third embodiment shown in FIGS. 12A and 12B, switching between a storing state in which the rear surveillance camera 38 is stored in the revolving frame 10 side and a visual check possible state in which the rear surveillance camera 38 is exposed to the outside is possible. That is, as shown in FIG. 13, this construction machine is provided with supporting means 50 for supporting the rear surveillance camera 38, drive means 51 for operating the supporting means 50, and switch means 52 for implementing ON/OFF operation of the drive means 51. The supporting means 50, as shown in FIGS. 12A and 12B, is comprised of an under cover 21 having a receiving member 53, the support frame 37 for attaching the rear surveillance camera 38 to this receiving member 53, and a supporting member (not shown) composed of a chain, a metal wire, and the like, for supporting a tip portion of the receiving member 53. By driving a motor, which is not shown, of the drive means 51, the above-mentioned supporting member is wound up or loosened so that the receiving member 53 is swung around its base end. Thus, in the open state of FIG. 12A, the receiving member 53 is held in a state in which a predetermined angle with respect to a horizontal direction is formed, and in the close state of FIG. 12B, a state in which the receiving member 53 lies in a horizontal direction is maintained. Thus, the open state of FIG. 12A corresponds to the visual check possible state in which the rear surveillance camera 38 is exposed to the outside, and the state of FIG. 12B corresponds to the storing state in which the rear surveillance camera 38 is stored in the revolving frame 10 side.

Therefore, in the construction machine shown in FIGS. 12A and 12B, operating the switch means 52 leads to the visual check possible state or the storing state. Thus, when the rear surveillance is not needed, by selecting the close state as shown in FIG. 12B so as to store the rear surveillance camera 38, the rear surveillance camera 38 is effectively protected and is hard to be damaged, and further a lens and the like can be prevented from being tainted. When an operator needs to confirm the rear, by selecting the open state by operating the switch means 52 as shown in FIG. 12A, the rear surveillance is possible and safety is ensured.

In this case, the construction machine may be structured in such a manner that by operating the switch means 52, surveillance by means of the rear surveillance means 40 is operated when the rear surveillance camera 38 is exposed and surveillance by the rear surveillance means 40 is stopped when the rear surveillance camera 38 is stored. That is, in the construction machine shown in FIGS. 12A and 12B, if in the structure in which rear images are displayed by operating the traveling operation means 26 as shown in FIG. 1, this traveling operation means 26 may be employed as the switch means 52 for such switching (the switching between the storage and exposure of the rear surveillance camera 38), and the switch 48 provided in the traveling operation means 26 as shown in FIG. 11 may be employed as the switch means 52. Of course, another switch independent of the switch means 52 may be provided so that the switching operation between the storage and exposure of the rear surveillance camera 38 and the surveillance operation of the rear surveillance means 40 are implemented by separate operations.

While specific embodiments of the present invention are explained above, the present invention is not limited to the above-mentioned features, and various modifications can be made to be implemented within the scope of the present invention. For example, as the attachment position of the rear surveillance camera 38, as long as the position is on the back surface side of the upper revolving body 3 between the counter weight 12 and the swing circle 16, the position is not limited to the under cover 21 of the revolving frame 10, and for example the position may be on another region of the revolving frame 10. A mechanism for putting the rear surveillance camera 38 in the storing state is not limited to the one shown in FIGS. 12A and 12B, and for example, such mechanism may be one in which the receiving member 53 vertically moves along a guide rail. Further, such mechanism may be one in which the rear surveillance camera 38 is vertically moved by a well-known, publicly used means, employing the under cover 21 as shown in FIG. 8. The screen for displaying images from the rear surveillance camera 38 and the screen 39 for displaying vehicle body condition may be fabricated separately. That is, the monitor screen of the monitoring device 41 may be divided so that it is possible that images from the rear surveillance camera 38 are displayed one side screen and vehicle body conditions are displayed on the other side screen. Additionally, a construction machine is not limited to a hydraulic shovel, and the present invention can be applied to various construction machines provided with a lower traveling body 1 and an upper revolving body 3 that is rotatably attached to this lower traveling body 1.

What is claimed is:

1. A construction machine comprising:
  a lower traveling body (1);
  an upper revolving body (3) that is rotatably attached to the lower traveling body (1);
  a traveling operation means (26) including travelling levers for moving said lower travelling body (1) forward or backward in such a way that when the travelling levers are pressed forward, the lower travelling body travels forward, and when the travelling levers are pulled backward, the lower travelling body travels backward;
  a monitor screen (39) having first and second display modes; and,
  a rear surveillance camera (38) arranged on said upper revolving body (3),
  wherein an image from said rear surveillance camera (38) is only displayed on said monitor screen (39) in said first display mode by operating said traveling operation means(26),
  wherein a vehicle body condition is displayed on said monitor screen in said second display mode when said travelling operation means (26) is not operated.

2. A construction machine comprising
  a lower travelling body (1);
  an upper revolving body (3) that is rotatably attached to the lower travelling body (1);
  a travelling operation means (26) including travelling levers for moving said lower travelling body (1) forward or backward in such a way that when the travelling levers are pressed forward, the lower travelling body travels forward, and when the travelling levers are pulled backward, the lower travelling body travels backward;
  a monitor screen (39); and
  a rear surveillance camera (38) arranged on said upper revolving body (3),
  wherein a switch (48) for allowing the monitor screen (39) to be in a state of displaying either an image from said rear surveillance camera (38) or a vehicle body condition is provided in said travelling operation means (26).

* * * * *